Inventor
THOMAS WALMSLEY &
RONALD CRAIG LEIGH
By Hooper Leonard & Glenn Attorneys Inventor
THOMAS WALMSLEY &
RONALD CRAIG LEIGH
By
Fowler, Leonard & Glenn Attorneys Jan. 1, 1952

T. WALMSLEY ET AL 2,581,056

SIGNAL TRANSMISSION SYSTEM

Filed May 11, 1949

4 Sheets-Sheet 3

*Inventor*
THOMAS WALMSLEY &
RONALD CRAIG LEIGH
By
Hooper Leonard & Glenn *Attorneys*

Jan. 1, 1952 T. WALMSLEY ET AL 2,581,056

SIGNAL TRANSMISSION SYSTEM

Filed May 11, 1949

4 Sheets-Sheet 4

Inventor
THOMAS WALMSLEY &
RONALD CRAIG LEIGH
By
Hooper, Leonard & Glenn Attorneys Patented Jan. 1, 1952

2,581,056

UNITED STATES PATENT OFFICE 2,581,056

SIGNAL TRANSMISSION SYSTEM

Thomas Walmsley, Ealing, London, and Ronald Craig Leigh, Taplow, England, assignors to British Telecommunications Research Limited, Taplow, England, a British company Application May 11, 1949, Serial No. 92,574
In Great Britain May 31, 1948

8 Claims. (Cl. 177—353)

Figures 1, 2, 8, 12:
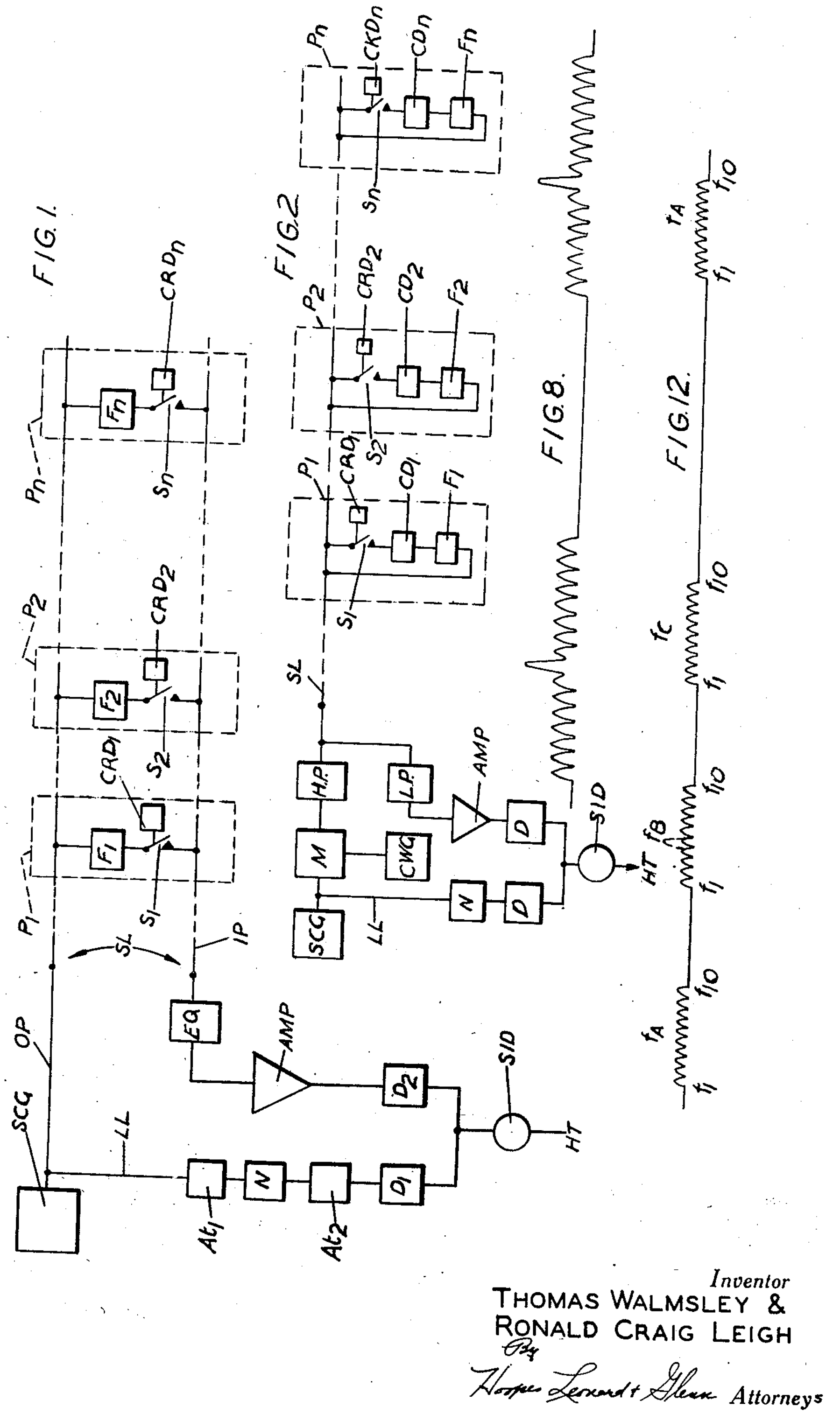

Where one or more of a series of condition-responsive devices are located at each of a number of physically remote points it is in many cases convenient to provide at a point at which one of the devices is located or at some other point an indication of the state of each device. This may be done by arranging for each device when it responds to a change of condition, for example, a local drop in pressure in a gas pressure cable system, to operate a pair of electric contacts which closes or opens an electric signalling circuit extending from the contacts to the point where the indication is required to be given. In such a signalling system the state of each condition-responsive device may be signalled to an indicator over a line common to all devices by an alternating electric current of which the passing is controlled by the contacts of that particular condition-responsive device and of which the frequency differs from those of the currents which are respectively controlled by the remaining devices of the series. This selective control of signal current by the contacts of each condition-responsive device is obtained by associating with the contacts of each device a filter which is selective to the particular frequency associated with that particular device.

By the present invention we provide an improved signalling system of the kind described. In accordance with the invention it comprises a signal current generator which generates current of which the frequency changes with time either gradually or in steps. This generator feeds a common signal-indicating device through two lines connected in parallel to the indicating device. One of these lines, hereinafter termed the signalling line, is a line which passes through each of a series of points at which condition-responsive devices are located. It comprises outgoing and incoming paths which may or may not be physically separate. The other line is a local line extending directly from the signal current generator to the common signal indicating device. The signal current generator and the local line co-operate to pass a succession of current impulses of different frequencies (the number of frequencies corresponding to the number of condition-responsive devices), through to the indicating device which responds to all the frequencies in turn. At each point in the series of points is a switch actuated by the condition-responsive device at that point and, in series with the switch, a filter selective to the particular frequency associated with that particular condition-responsive device and serving, when the switch is in the closed position, to transfer signal current of that frequency from the outgoing to the incoming path of the signalling line. The arrangement provides for an indication being given of each current impulse passed by the local line and shows by a variation of one (or more) such indication in a series of indications, due to the receipt by the indicating device of an impulse of a particular frequency passed by the signalling line, or by its failure to receive such an impulse, a change in position of the switch at the point in the series of points which is associated with that particular frequency.

Figure 3:
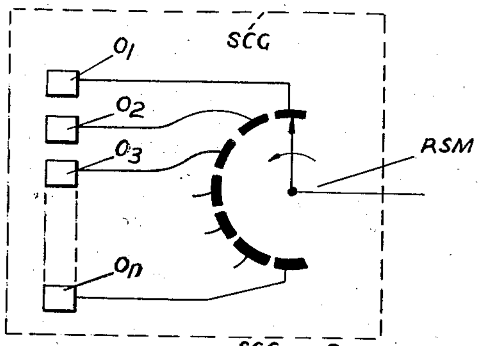
Figure 4:
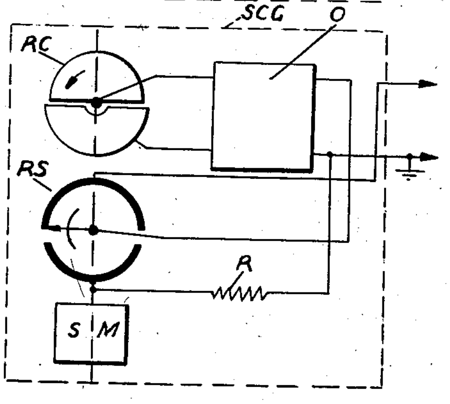
Figure 7:
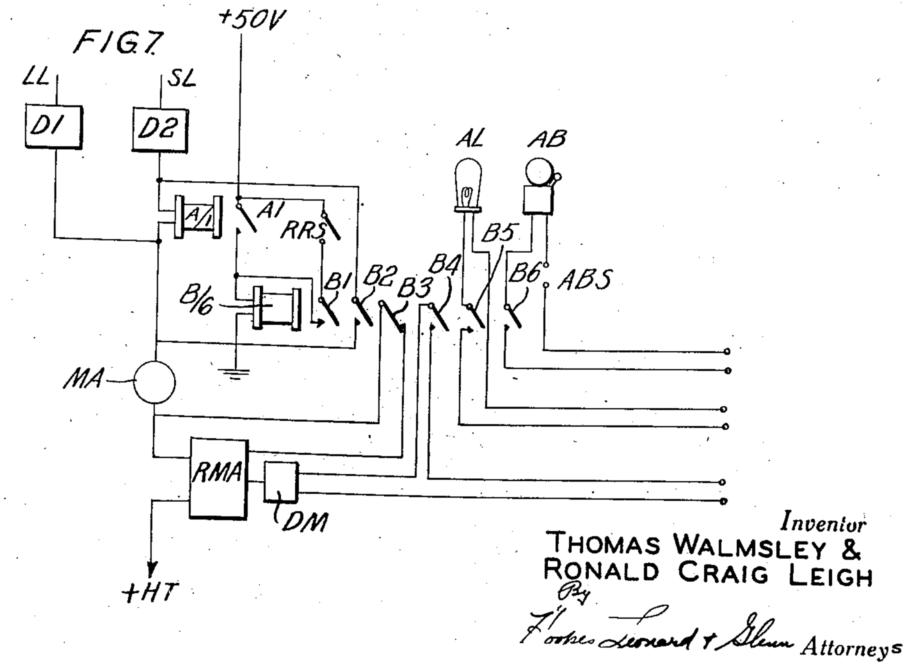
Figures 5, 6, 11:
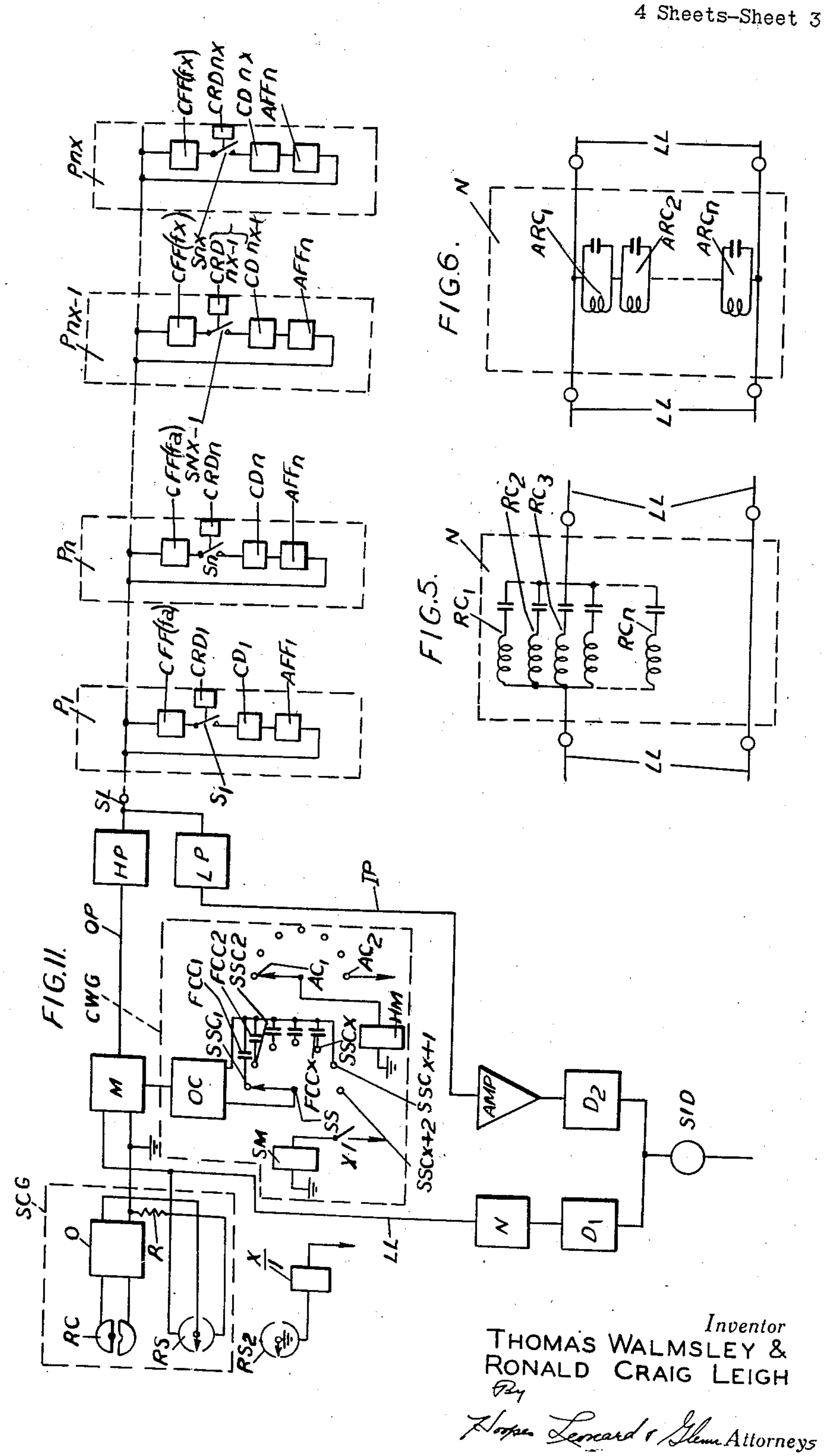
Figure 9:
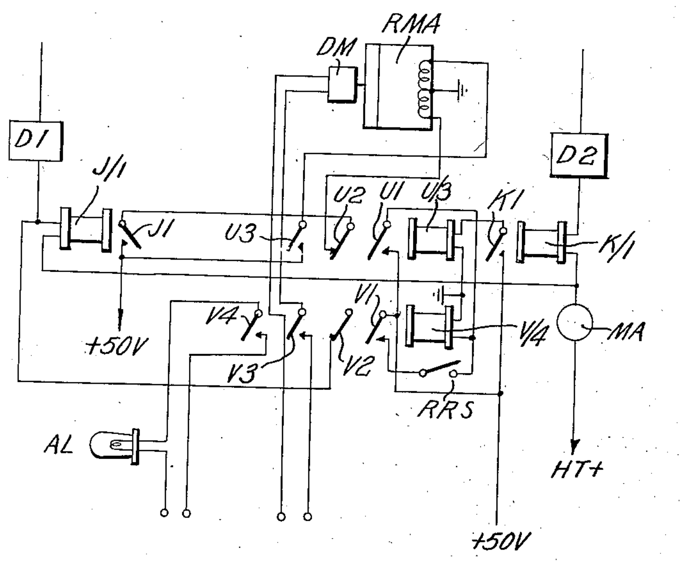
Figure 10:
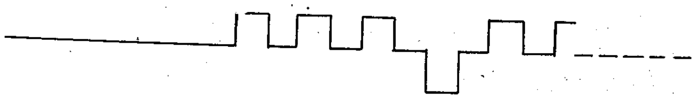

The invention will be further described with the aid of the accompanying drawings wherein:

Figure 1 is a block diagram of an example of a signalling system constructed in accordance with the invention, Figure 2 is a block diagram of a second example of a signalling system constructed in accordance with the invention, Figure 3 is a diagram of one form of signal current generator, Figure 4 is a diagram of an alternative form of signal current generator, Figures 5 and 6 show two alternative forms of network for use in our signalling system, Figure 7 is a diagram of means for recording a change in condition at one or more points in the system, Figure 8 shows a graph obtained by the recording means of Figure 7, Figure 9 is a diagram of a modified form of the recording apparatus shown in Figure 7, Figure 10 shows a graph obtained by the recording means of Figure 9, Figure 11 is a block diagram of a modified arrangement of a signalling system of the form shown in Figure 2, and Figure 12 shows a graph obtained by recording means associated with the modified signalling arrangement of Figure 11.

In the example of signalling system shown in Figure 1, the signal current generator SCG, generating current of which the frequency changes with time in a regular manner, feeds a common signal indicating device SID through a signalling line SL and a local line LL. The former passes through each of a series of physically remote points or stations, $P_1$, $P_2$, . . . $P_n$, at which are located condition-responsive devices, $CRD_1$, $CRD_2$ . . . $CRD_n$, respectively, and comprises two cable pairs, one forming an outgoing path OP and the other cable pair forming an incoming path IP. The local line extends directly, i. e.

without passing through the points $P_1$, $P_2$ etc., from the signal current generator SCG to the signal indicating device SID and co-operates with the generator to pass a succession of current impulses of different frequencies, $f_1$, $f_2$ . . . $f_n$, through to the device SID which responds to all the frequencies in turn. At the points or stations, $P_1$, $P_2$ . . . $P_n$, are switches, $S_1$, $S_2$ . . . $S_n$, respectively, actuated by condition-responsive devices $CRD_1$, $CRD_2$ . . . $CRD_n$, respectively. These devices may, for instance, each comprise a biased diaphragm which moves over on the occurrence of a fall in fluid pressure of a given value or a snap action bi-metallic strip which changes its position on the occurrence of a rise in temperature of a given value. In series with the switch $S_1$ at point $P_1$ is a filter $F_1$ selective to a particular frequency associated with point $P_1$ and serving on closure of switch $S_1$ to transfer signal current of that frequency from the outgoing path OP to the incoming path IP of the signalling line SL. Similarly a filter $F_2$ selective to a different frequency, which is associated with point $P_2$, is in series with switch $S_2$, and so on for all points.

In the arrangement shown in Figure 1, the outgoing and incoming paths of the signalling line are physically separate and the current from the generator is injected directly into the outgoing path. Where the outgoing and incoming paths are not physically separate but are formed from the same cable pair, as shown in Figure 2, the current from the signal generator SCG is injected into the line through a modulator M and used to modulate a carrier wave produced by a carrier wave generator CWG. The modulated carrier wave is passed through a high-pass filter HP into the signalling line SL. When the switch ($S_1$, $S_2$ . . . or $S_n$) at any point is in the closed position the modulated carrier wave is passed through a detecting device ($CD_1$, $CD_2$ . . . or $CD_n$) which detects the modulation and applies it to the local audio frequency filter $F_1$, $F_2$ . . . or $F_n$, which passes the particular frequency ($f_1$, $f_2$ . . . or $f_n$) associated with that particular point or station back to the same cable pair which also serves as the incoming path of the line and passes the detected signals to the indicating device SID through a low pass filter LP in parallel with the high pass filter HP.

Preferably the switches $S_1$, $S_2$ . . . $S_n$, controlled by the condition-responsive devices are arranged to be open when conditions are normal and to be closed by the condition-responsive devices $CRD_1$, $CRD_2$ . . . $CRD_n$, respectively when conditions become abnormal. Thus an abnormal condition at any point $P_1$, $P_2$ . . . or $P_n$ results in an additional impulse of signal current being fed to the indicator. This additional impulse, of which the frequency will depend on the particular condition-responsive device that has operated, will be added to that being received over the local line LL, with the result that the magnitude of the indication given by the signal indicating device SID, e. g. the deflection of the instrument pointer, is increased. So that this increase in magnitude shall not vary with the frequency of the particular signal received over the signalling line SL and with the distance from the indicating device SID of the point where conditions are abnormal, it is preferred to insert an attenuation equaliser, shown at EQ in Figure 1, in the incoming path of the signalling line.

The signal current generator SCG for feeding the two lines SL and LL may, as shown in Figure 3, comprise a plurality of separate audio frequency oscillators $O_1$, $O_2$ . . . $O_n$ generating frequencies $f_1$, $f_2$ . . . $f_n$, respectively, in conjunction with rotary switching means RSM for cutting in and cutting out each oscillator in turn. It is convenient to make the intervals between the cutting out of one oscillator and the cutting in of the next small and constant except that between the cutting out of the last $O_n$ of the series and the cutting in of the first $O_1$ so as to provide, where the switching cycle is repeated, an indication of the termination of each switching cycle. Preferably, however, the signal current generator SCG comprises a sweep oscillator which is swept through a range of audio frequencies $f_1$, $f_2$ . . . $f_n$ where "$n$" is the number of condition-responsive devices in the system. It may be under manual control or be arranged to sweep continuously by mechanical or electronic means. An example of a suitable form of automatic sweep oscillator is shown in Figure 4. It comprises an oscillator O having a small synchronous motor SM driving a continuously rotatable capacitor RC controlling the oscillator frequency and a rotary switch RS for connecting the oscillator output to the signalling and local lines during one half of each complete revolution of the movable vanes of the capacitor RC and short-circuiting the output of the oscillator through a resistance R during the other half of each complete revolution. As the vanes move in, the frequency varies over the desired range and as they move out the output of the oscillator O is short-circuited so that the direction of the sweep of the frequency is always the same.

Where a sweep oscillator is used to feed the two lines, the local line includes a network N (Figures 1 and 2) designed to offer minimum attenuation to frequencies $f_1$, $f_2$ . . . $f_n$, and maximum attenuation to frequencies midway between $f_1$ and $f_2$, $f_2$ and $f_3$, etc. The network may consist of a number of resonant circuits, $RC_1$, $RC_2$ . . . $RC_n$, connected in parallel as shown in Figure 5. Alternatively, the network may consist, as shown in Figure 6, of a number of anti-resonant circuits $ARC_1$, $ARC_2$ . . . $ARC_n$, connected in series.

Both in the arrangement shown in Figure 1 and in that shown in Figure 2, the incoming path IP of the signalling line SL and the output end of the local line LL each feed the single signal indicating device SID through one or other of a pair of detectors, $D_1$, $D_2$. Generally attenuation pads $At_1$, $At_2$ (Figure 1) will be included in the local line LL and an amplifier AMP will be inserted in the incoming path IP of the signalling line SL, with the object of obtaining local and distant signals of the same level or of any other predetermined level ratio.

The signal indicating device SID may be a current-responsive device, conveniently, a milliammeter. In this case, if conditions at all points in the series of points at which condition-responsive devices are installed are normal, as the frequency of the signal current changes from $f_1$ through $f_2$ to $f_n$ impulses of current are fed by the local line LL to its detector $D_1$ and the milliammeter pointer swings between a minimum and a maximum deflection, the latter occurring whenever the transmitted frequency corresponds to one of the particular frequencies $f_1$, $f_2$, etc. In the preferred arrangement, in which the switches $S_1$, $S_2$ . . . $S_n$ are normally open, in the event of an abnormal condition arising at any point in the series, say the point or station $P_2$ which is associated with a frequency $f_2$, the frequency $f_2$ is transmitted through the switch $S_2$ and filter $F_2$ at that point and by the incoming path IP of the signalling line SL to the amplifier AMP and the detector $D_2$. The output from the latter combines with that from the local circuit detector $D_1$ to give a larger deflection. By an appropriate use of attenuation pads $At_1$, $At_2$ and adjustment of the gain of the amplifier AMP it is possible to arrange that an abnormal condition is indicated by, say, a full scale deflection and a normal condition, by, say, a quarter of the full scale deflection of the meter. Thus, as the frequency of the current from the signal current generator SCG changes from $f_1$ through $f_2$ to $f_n$, the number of minor deflections may be counted until a major deflection is observed. It is then known that there is an abnormal condition at a point associated with the frequency occupying a particular numerical position in the group of successive impulses of frequencies $f_1, f_2 \ldots f_n$. Generally it will be convenient to make the association of the condition-responsive devices and the various freqnencies such that the numerical position of a particular frequency in the group of impulses corresponds with the number of the condition-responsive device in the series of points or stations, $P_1, P_2 \ldots P_n$.

Where it is desired to make a record of a change in condition serving to operate a switch $S_1$, $S_2$ or $S_n$, bridging the signalling line SL, a recording milliammeter may be inserted in series with, or in place of, the milliammeter described. In the arrangement shown in Figure 7, a recording milliammeter RMA is inserted in series with a milliammeter MA and its operation is controlled by means of a relay A/1 in circuit with the detector $D_2$ fed by the signalling line SL. This relay controls a second relay B/6 having a pair of contacts $B_3$ normally serving to short circuit the terminals of the recording milliammeter. When a condition-responsive device operates and current of the frequency corresponding to that device is being fed into the signalling line, current flows in the detector $D_2$ and operates the first relay A/1. Operation of this relay causes the second relay B/6 to operate. The relay B/6 holds itself through one pair $B_1$ of its contacts. At the same time a second pair $B_2$ of its contacts closes to short circuit the first relay A/1 to prevent it operating during subsequent cycles, and the pair of contacts $B_3$ short circuiting the terminals of the recording ammeter RMA is opened. A fourth pair of contacts $B_4$ closes and starts the driving motor DM of the recorder. Other pairs of contacts $B_5$ and $B_6$ may put into operation visual and audible alarms AL and AB, respectively. The latter may be stopped by opening switch ABS but the recorder RMA will continue to operate until the second relay B/6 is manually released by opening relay release switch RRS, and will trace a graph consisting of a series of closely adjacent peaks separated by a straight line from a succeeding series of closely adjacent peaks. As in the example shown in Figure 8 all of these peaks will be of uniform height except that due to the particular frequency of the sweep corresponding to the position of the point where there is an abnormal condition, which will be, say of twice or three times the height of each of the remainder. Each group of peaks constituting a single trace will thus indicate at a glance the location of the abnormal point in the series of points. In Figure 8, the trace shows that an abnormal condition exists at point No. 8 in the series of sixteen points.

With the recording apparatus described with reference to Figure 7 a fault is indicated by a variation in magnitude of one of a series of indications with respect to the remaining indications of the series. In some cases it is preferable to arrange for a fault to be indicated by a variation in direction, or by a variation in both magnitude and direction, of one indication with respect to the remaining indications of the series. This may be done by a modified form of the recording apparatus shown in Figure 7. In this modified form, which is shown in Figure 9, there is inserted a relay J/1 in circuit with the detector D1 of the local line and a relay K/1 in circuit with the detector D2 of the signalling line. The relay J/1 is normally short circuited by contacts $V_2$, only the milliammeter being then operative. When owing to the operation of a condition-responsive device, current of a frequency corresponding to that device is fed into the signalling line, current flows in detector $D_2$ and operates relay K/1. Operation of this relay causes a relay U/3 to operate which in turn operates a fourth relay V/4 and releases again. Relay V/4 holds by contacts $V_1$. Contacts $V_3$ and $V_4$ close, the former starting the driving motor DM of the recording ammeter $RMA^1$ and the latter closing the circuit of the alarm lamp AL. Contacts $V_2$ open and permit relay J/1 to operate to close contacts $J_1$ which apply an appropriate voltage over normally closed contacts $V_2$ to one winding of the double wound recorder $RMA^1$. This voltage is applied each time signal is passed through the local line LL except when a fault indicating signal is passed through the signalling line SL. When signal currents pass through both lines operation of relay K/1, which operates relay U/3, causes contacts $U_2$ to open and interrupt the supply through the recorder winding fed through contacts $J_1$ and causes contacts $U_3$ to close to connect the other winding of the recorder to the supply. Figure 10 shows an example of a type of trace obtained by this modified form of recording apparatus. It indicates, by the position of the peak below the datum line that an abnormal condition exists at point No. 4 in the series.

The arrangement described with reference to Figures 1 to 10 of the drawings will operate satisfactorily with currents in the audio-frequency range where the number of condition-responsive devices in the series is not too great. In this range it is possible to obtain adequate selectivity using simple filters at frequency spacings of some 120 cycles per second. Above this range it becomes increasingly difficult to obtain adequate selectivity and a wider spacing of frequencies becomes necessary if more indications are required. This would give an irregularly spaced trace on the recording instrument. This variation in spacing can be avoided by modifying the arrangement of the kind described with reference to Figure 2 in which the signal generator SG is used to modulate a carrier wave.

In this modified arrangement the frequency of the carrier wave is changed at the end of each group of current impulses passed to the signal indicating device by the local line, that is to say, where the signal current generator is a sweep oscillator, at the end of each sweep of the oscillator and where it comprises a plurality of separate oscillators and rotary switching means, at the end of each switching cycle, until a predetermined number ($x$) of groups has passed through to the indicating device after which the carrier frequency returns to its original value and the transmission cycle of sweeps or switching cycles may be restarted. The number "$n$" of different frequencies in each group is preferably but not necessarily the same for all $x$ groups constituting the transmission cycle. When provision is made for the transmission cycle to be repeated, the point at which there is an abnormal condition may be readily identified by arranging for a time delay between the end of one complete cycle and the beginning of the next. This identification is facilitated if there is provided a different, preferably shorter, time delay between each change in carrier wave frequency. The arrangement preferred is shown in Figure 11. It comprises an oscillator O tunable over the audio-frequency band by means of a variable tuning capacitor continuously driven by a synchronous motor as described with reference to Figure 4. In the present case the switch RS connects the output of the oscillator to the signalling line through a modulator M. When the switch RS disconnects the oscillator from the modulator M and terminates it in a resistance R, a second rotary switch RS2 on the driving spindle of the capacitor RC closes the operating circuit of a relay X/1. Operation of this relay operates the stepping magnet SM of a selector switch SS which, in moving from one contact, SSC1, to the next SSC2, removes a frequency controlling capacitor FCC1 from the tuned circuit of a second oscillator OC supplying a carrier frequency to the modulator M and inserts a capacitor FCC2 of different value, whereby the carrier frequency is changed. At the penultimate position of the selector switch (on contact SSC$x$+1 if the carrier wave frequency is to be changed $x$ times in each transmission cycle), the tuned circuit is short circuited, and at the final position SSC$x$+2 auxiliary contacts AC1 and AC2 close to operate a homing magnet HM causing the selector switch SS to return to its initial position. At the first $n$ points or stations, namely, at points $P_1$, $P_2$ . . . $P_n$, carrier frequency filters CFF($f_a$) and detectors $CD_1$, $CD_2$ . . . $CD_n$, respectively, are inserted between the line and the audio frequency filters $AFF_1$, $AFF_2$ and $AFF_n$, respectively, and in series with the switches $S_1$, $S_2$ . . . $S_n$, respectively. At the points $P_{n+1}$, $P_{n+2}$ . . . $P_{2n}$ carrier frequency filters CFF($f_b$) and detectors $CD_{n+1}$, $CD_{n+2}$ . . . $CD_{2n}$, respectively, are correspondingly inserted, and so on for each other group of points. The carrier frequency filters at each of $n$ neighbouring points forming a group in the series of $nx$ points are similar and differ from those at each of a corresponding number of neighbouring points forming another group in the series. For example, if there are thirty condition-responsive devices, one at each of thirty points, ten audio frequencies, $f_1$ . . . $f_{10}$ can be employed modulating each of three carrier frequencies, $f_a$, $f_b$ and $f_c$, in turn. The carrier frequency filters CFF($f_a$) at the first ten points will be similar and all pass the frequency $f_a$, while each of the audio frequency filters $AFF_1$ . . . $AFF_{10}$ will pass one of the frequencies $f_1$ . . . $f_{10}$. At the next ten indicating points, $P_{11}$ . . . $P_{20}$, the carrier frequency filters CFF($f_b$) will pass frequency $f_b$ and each of the audio frequency filters, $AFF_1$ . . . $AFF_{10}$, will pass one of the frequencies $f_1$ . . . $f_{10}$, and so on. Figure 12 shows an example of a normal trace produced by recording apparatus of the form shown in Figure 7 fed by the two detectors $D_1$ and $D_2$ of this modified arrangement constructed to deal with 30 points or stations. Here the termination of one complete trace and the commencement of a succeeding trace is indicated by a greater spacing between the groups of peaks. This greater spacing may be brought about by suppressing one or more complete groups of signal current impulses fed to the indicating device through the local line, or by short circuiting the recorder during the passage of such group or groups. Either of these may be done, for instance, by means of a relay which is operated by the closing of a second pair of auxiliary contacts by the selector switch when it reaches its penultimate position and is released at the end of the homing operation of the selector switch. Thus if a condition-responsive device operates at a station associated with carrier frequency $f_b$ and audio frequency $f_5$ an indication will be given on the recording meter trace by an increase in the height of the fifth peak of the second of the three groups of ten peaks forming the complete trace, as shown by the broken line in Figure 12. A definite indication of the location of the change in condition is thus given. In cases where it is not possible to divide the series of points or stations into numerically equal groups, it is preferable to arrange for the last group to have fewer points than the number of different frequencies in a group of impulses. Thus if, for example, there were twenty-eight points or stations instead of thirty, the trace would be of the form shown in Figure 12 but the last two peaks of the third group of peaks would be ignored. It will be apparent that if recording apparatus of the form shown in Figure 9 be used instead, a trace of the type shown in Figure 10 will be obtained.

What we claim as our invention is:

1. An alternating current signalling system for signalling the state of each of a number of remote condition-responsive devices to an indicating device, comprising a signal current generator of which the frequency changes with time, a signal indicating device, two lines in parallel between said generator and said indicating device, one of said lines being a local line co-operating with said generator to pass a succession of current impulses of different frequencies through to said indicating device which responds to all said impulses in turn and the other of said lines being a signalling line, comprising outgoing and incoming paths, which passes through each of a series of points, condition-responsive devices located at said points, and at each point in the series means comprising a switch actuable by the condition-responsive device at that point and, in series with the switch, a filter selective to a particular frequency that is associated with that particular condition-responsive device, for transferring signal current of the said frequency from the outgoing to the incoming path of the signalling line by which it is passed to the indicating device to vary the indication given thereby.

2. An alternating current signalling system for signalling the state of each of a number of remote condition-responsive devices to an indicating device, comprising a signal current generator of which the frequency changes with time, a signal indicating device, two lines in parallel between said generator and said indicating device, one of said lines being a local line co-operating with said generator to pass a succession of current impulses of different frequencies through to said indicating device which responds to all said impulses in turn and the other of said lines being a signalling line, comprising outgoing and incoming paths, which passes through each of a series of points, condition-responsive devices located at said points, means at each point in the series comprising a switch actuable by the condition-responsive device at that point and, in series with the switch, a filter selective to a particular frequency that is associated with that particular condition-responsive device, for transferring signal current of the said frequency from the outgoing to the incoming path of the signalling line by which it is passed to the indicating device to vary the indication given thereby, and an attenuation equalizer in the incoming path of the signalling line for reducing to a common level the impulses passed to the indicating device by the signalling line.

3. An alternating current signalling system for signalling the state of each of a number of remote condition-responsive devices to an indicating device, comprising a signal current generator of which the frequency changes with time, a signal indicating device, two lines in parallel between said generator and said indicating device, one of said lines being a local line co-operating with said generator to pass a succession of current impulses of different frequencies through to said indicating device which responds to all said impulses in turn and the other of said lines being a signalling line, comprising outgoing and incoming paths, which passes through each of a series of points, condition-responsive devices located at said points, means at each point in the series comprising a switch actuable by the condition-responsive device at that point and, in series with the switch, a filter selective to a particular frequency that is associated with that particular condition-responsive device, for transferring signal current of the said frequency from the outgoing to the incoming path of the signalling line by which it is passed to the indicating device to vary the indication given thereby, signal attenuating means in said local line and an amplifier in the incoming path of said signalling line.

4. An alternating current signalling system for signalling the state of each of a number of remote condition-responsive devices to an indicating device, comprising a sweep oscillator for sweeping through a range of audio frequencies, a signal indicating device, two lines in parallel between said oscillator and said indicating device, one of said lines being a local line and the other of said lines being a signalling line, comprising outgoing and incoming paths, which passes through each of a series of points, a condition-responsive device at each of said points, means at each of said points for transferring signal current of a particular frequency associated with the condition-responsive device at that point and lying within said range of frequencies from the outgoing to the incoming path of the signalling line, said means including a switch actuable by said condition-responsive device and, in series with said switch, a filter selective to the said particular frequency, and in said local line a network offering minimum attenuation to frequencies to which said filters in said signalling line are selective and maximum attenuation to frequencies intermediate each filter-selected frequency and the next filter-selected frequency of the said range of frequencies, whereby the local line passes a succession of current impulses of different frequencies through to said indicating device which gives an indication that is varied by signal current received through the signalling line.

5. An alternating current signalling system for signalling the state of each of a number of remote condition-responsive devices to an indicating device, comprising a signal current generator of which the frequency changes with time, a signal indicating device, two lines in parallel between said generator and said indicating device, one of said lines being a local line and the other of said lines being a signalling line, comprising outgoing and incoming paths, which passes through each of a series of points, means including said signal generator and said local line for passing a succession of current impulses through the local line to the indicating device in groups separated by a time delay, each of said groups comprising one impulse of each of a number of different frequencies, a condition-responsive device at each point in said series of points, and means at each point in said series of points for transferring signal current of a particular frequency associated with the condition-responsive device at that point and being one of said number of different frequencies, from the outgoing to the incoming path of the said signalling line, whereby it is passed to said indicating device to vary the indication given thereby, the last said means including a switch actuable by the condition-responsive device at that point and, in series with said switch, a filter selective to the said particular frequency.

6. An alternating current signalling system for indicating the state of each of a number of condition-responsive devices located one at each of a series of points, comprising a signal current generator of which the frequency changes with time, a signal indicating device, a local line co-operating with said generator to pass a succession of current impulses of different frequencies through to said indicating device which responds to all the impulses in turn, a signalling line passing through each of a series of points and having outgoing and incoming paths, a high-pass filter, a low-pass filter, a carrier wave generator, means including a modulator for feeding current from said signal current generator and current from said carrier wave generator into the outgoing path of said signalling line through said high-pass filter, and, at each point in the series, a condition-responsive device and means for controlling the passage of current between the outgoing and incoming paths of the line, said controlling means including a switch actuated by the condition-responsive device at that point, a local filter selective to a particular frequency associated with the condition-responsive device at that point and a detector which detects the modulation of the modulated carrier wave and on closure of the switch applies it to said local filter which passes it back to the signalling line of which the incoming path feeds said indicating device through said low-pass filter, whereby to vary the indication.

7. An alternating current signalling system for indicating the state of each of a number of condition-responsive devices located, one at each of a series of points, comprising a signal current generator of which the frequency changes with time, a signal indicating device, means including two lines in parallel for connecting said generator to said indicating device, one being a local line co-operating with said generator to pass excessive groups of current impulses, each group being separated by a time delay from the preceding group and consisting of successive current impulses of different audio-frequencies, through to said indicating device which responds to all the impulses in turn, and the other being a signalling line passing through each of a series of points and having outgoing and incoming paths, a condition responsive device at each point in the series of points, means at each point for controlling the passage of current between the said outgoing and incoming paths, said means including a switch actuable by the condition-responsive device at that point and an audio-frequency filter selective to a particular one of said frequencies, a carrier wave generator, means including a modulator, for feeding current from said signal current generator and current from said carrier wave generator into the outgoing path of said signalling line, a carrier frequency filter and a detector inserted, at each point in the series of points, between the line and the said audio-frequency filter and in series with the said switch, and means for changing the frequency of the carrier wave at the end of each complete group of current impulses until a predetermined number of groups has been passed through the local line to the indicating device, the points in the series being associated in groups and the carrier frequency filters at all points in each group of points being selective to a carrier wave frequency which differs from the frequency to which the carrier frequency filters of each other group of points are selective.

8. An alternating current signalling system for indicating the state of each of a number of condition-responsive devices located, one at each of a series of points, comprising a signal current generator of which the frequency changes with time, a signal indicating device, means including two lines in parallel for connecting said generator to said indicating device, one of said lines being a local line and the other of said lines being a signalling line, comprising outgoing and incoming paths, which passes through each of a series of points, means including said signal generator and said local line for passing a succession of current impulses through the local line to the indicating device, in groups forming a plurality of complete transmission cycles, each of said groups being separated by a time delay from the preceding group and consisting of successive current impulses of different audio-frequencies, the time delay separating each two successive groups of impulses in one transmission cycle differing from the delay separating the last group of one cycle from the first group of the next cycle, a carrier wave generator, means including a modulator, for feeding current from said signal current generator and current from said carrier wave generator into the outgoing path of said signalling line, a condition-responsive device at each point in the series of points, means at each of said points for controlling the passage of current between the outgoing and incoming paths of said signalling line, last said means including a switch actuable by the condition-responsive device, an audio-frequency filter selective to a particular one of said different frequencies and a carrier frequency filter and a detector inserted between the signalling line and the said audio frequency filter and in series with the said switch, means for changing the frequency of the carrier wave at the end of each complete group of current impulses until a predetermined number of groups constituting one complete transmission cycle has passed through the local line to the said indicating device, the points in the series of points being grouped and the carrier frequency filters at all points in each group of points being selective to a carrier wave frequency which differs from the frequency to which the carrier frequency filters of each other group of points are selective.

THOMAS WALMSLEY.
RONALD CRAIG LEIGH.

REFERENCES CITED

The following references are of record in the file of this patent:

UNITED STATES PATENTS

| Number | Name | Date |
|---|---|---|
| 1,889,597 | FitzGerald | Nov. 29, 1932 |
| 2,111,352 | Blake et al. | Mar. 15, 1938 |
| 2,117,580 | Snavely | May 17, 1938 |